United States Patent
Bialy et al.

(10) Patent No.: US 11,763,228 B2
(45) Date of Patent: Sep. 19, 2023

(54) SYSTEMS AND METHODS FOR ANALYZING AND CONNECTING AUTOMATION SEQUENCES

(71) Applicant: Nice Ltd., Ra'anana (IL)

(72) Inventors: Yaron Moshe Bialy, Madrid (ES); Yuval Shachaf, Even Yehuda (IL); Eran Roseberg, Hogla (IL)

(73) Assignee: Nice Ltd., Ra'anana (IL)

( * ) Notice: Subject to any disclaimer, the term of this patent is extended or adjusted under 35 U.S.C. 154(b) by 178 days.

(21) Appl. No.: 17/223,537

(22) Filed: Apr. 6, 2021

(65) Prior Publication Data

US 2022/0318713 A1    Oct. 6, 2022

(51) Int. Cl.
| | | |
|---|---|---|
| *G06Q 10/0631* | (2023.01) | |
| *G06Q 10/0639* | (2023.01) | |
| *G06Q 10/0633* | (2023.01) | |
| *G06V 10/75* | (2022.01) | |

(52) U.S. Cl.
CPC ... *G06Q 10/06316* (2013.01); *G06Q 10/0633* (2013.01); *G06Q 10/0639* (2013.01); *G06V 10/7557* (2022.01)

(58) Field of Classification Search
CPC ......... G06V 10/00–40/00; G06Q 10/00–50/00
USPC ................................................. 705/7.11–7.42
See application file for complete search history.

(56) References Cited

U.S. PATENT DOCUMENTS

| | | | | |
|---|---|---|---|---|
| 10,459,951 B2* | 10/2019 | Venkataraman | ...... | G06F 16/285 |
| 10,613,838 B2* | 4/2020 | Kim | ................. | G06Q 10/06398 |
| 11,433,536 B2* | 9/2022 | Berg | ................. | G06Q 10/0633 |
| 2003/0074369 A1* | 4/2003 | Schuetze | ............... | G06F 16/355 |
| 2010/0121859 A1 | 5/2010 | Maeda et al. | | |
| 2014/0282586 A1* | 9/2014 | Shear | .................... | G06F 9/5072 718/104 |
| 2015/0154526 A1 | 6/2015 | Yates et al. | | |
| 2017/0032417 A1 | 2/2017 | Amendijian et al. | | |
| 2017/0060108 A1* | 3/2017 | Kakhandiki | ............. | G06N 5/01 |
| 2017/0124075 A1* | 5/2017 | Deng | ...................... | G06F 16/93 |
| 2017/0262899 A1 | 9/2017 | Geraghty et al. | | |
| 2017/0277625 A1 | 9/2017 | Shtuchkin et al. | | |
| 2018/0032601 A1* | 2/2018 | Venkataraman | ...... | G06F 16/285 |

(Continued)

OTHER PUBLICATIONS

Fournier-Viger, Philippe, "A Survey of Sequential Pattern Mining", Data Science and Pattern Recognition, vol. 1, No. 1, Feb. 2017.

(Continued)

*Primary Examiner* — Alan S Miller
(74) *Attorney, Agent, or Firm* — PEARL COHEN ZEDEK LATZER BARATZ LLP (57) ABSTRACT

A method and system for analyzing and connecting computer-based actions into sentences may include for a series of computer-based actions, determining the case ID for the action for each action where an identifier or case ID can be determined, creating sequences of subsets of the series of computer-based actions using the case ID, and merging sequences having computer-based actions having the same case ID. A set of case IDs may be extracted from the actions using a clustering algorithm based on features of potential case IDs such as gaps in appearance of potential case IDs in a sequence of actions and consecutive appearances of potential case IDs in a sequence of actions. The extracted case IDs may be used when creating sequences.

28 Claims, 5 Drawing Sheets

(56) References Cited

U.S. PATENT DOCUMENTS

| | | | |
|---|---|---|---|
| 2018/0113781 A1* | 4/2018 | Kim | G06F 11/3438 |
| 2018/0225583 A1 | 8/2018 | Chen et al. | |
| 2018/0302302 A1 | 10/2018 | Doggett et al. | |
| 2019/0007228 A1 | 1/2019 | Vuskovic et al. | |
| 2019/0025851 A1 | 1/2019 | Afrouzi | |
| 2019/0087691 A1 | 3/2019 | Jelveh | |
| 2019/0180218 A1 | 6/2019 | Vigneswaran | |
| 2019/0205792 A1 | 7/2019 | Huang | |
| 2019/0384657 A1 | 12/2019 | Chen et al. | |
| 2020/0050983 A1 | 2/2020 | Balasubramanian et al. | |
| 2020/0104169 A1 | 4/2020 | Powell | |
| 2020/0125586 A1 | 4/2020 | Rezaeian et al. | |
| 2020/0151826 A1 | 5/2020 | Ghaffar et al. | |
| 2020/0206920 A1 | 7/2020 | Ma et al. | |
| 2020/0219033 A1 | 7/2020 | Smutko et al. | |
| 2020/0225583 A1 | 7/2020 | Yoshida et al. | |
| 2020/0233865 A1 | 7/2020 | Myers et al. | |
| 2020/0401430 A1 | 12/2020 | Berg et al. | |
| 2020/0410392 A1 | 12/2020 | Verma et al. | |
| 2021/0086354 A1 | 3/2021 | Berg et al. | |
| 2021/0110345 A1 | 4/2021 | Iyer et al. | |
| 2021/0150137 A1 | 5/2021 | Chittari et al. | |
| 2021/0158256 A1 | 5/2021 | Negulescu | |
| 2021/0232372 A1 | 7/2021 | Da Silva Baptista Russo et al. | |

OTHER PUBLICATIONS

Fournier-Viger, Philippe, et al., "VGEN: fast vertical mining of sequential generator patterns," The International Conference on Data Warehousing and Knowledge Discovery, pp. 476-488, 2014.

Yi, Shengwei, "An effective algorithm for mining sequential generators Procedia Engineering 15" (2011).

https://www.automationanywhere.com/home, printed on Jan. 25, 2021.

www.celonis.com/homepage, printed on Jan. 25, 2021.

https://www.fortressiq.com/, printed on Jan. 25, 2021.

https://www.kryonsystems.com/process-discovery/, printed on Jan. 26, 2021.

https://www.minit.io/use-cases/robotic-process-automationare, printed on Jan. 25, 2021.

https://processgold.com/company-news/new-website/, printed on Jan. 25, 2021.

https://www.promtools.org/doku.php, printed on Jan. 25, 2021.

https://www.abbyy.com/timeline/, printed on Jan. 25, 2021.

https://www.uipath.com/automation/enterprise, printed on Jan. 25, 2021.

Santos, F., Pereira, R., & Jose, B. V. (2020). Toward robotic process automation implementation: An end-to-end perspective. Business Process Management Journal, 26(2), 405-420. (Year: 2020).

Chandak, Yash, et al. "Learning action representations for reinforcement learning." International conference on machine learning. PLMR, 2019. (Year: 2019).

Dezfouli, Amir, and Bernard W. Balleine. "Habits, action sequences and reinforcement learning." European Journal of Neuroscience 35.7 (2012): 1036-1051. (Year: 2012).

Marufuzzaman, Mohd, and Mamun Bin Ibne Reaz. "Hardware simulation of pattern matching and reinforcement learning to predict the user next action or smart home device usage." World Applied Sciences Journal 22.9 (2013): 1302-1309. (Year: 2013).

Agrawal et al., "Mining Sequential Patterns", Proceeding of the 11th International Conference on Data Engineering. CA: Los Alamitos, IEEE Computer Society, pp. 3-14, 1995.

Deisenroth et al., "PILCO: A Model-Based and Data-Efficient Approach to Policy Search", In Proceedings of the 28th International Conference on machine learning (ICML-11), pp. 465-472, 2011.

Kryon, "Automated Business Process Discovery", retrieved Sep. 6, 2019 from https://www.kryonsystems.com/process-discovery/.

Mnih et al. "Human-Level Control Through Deep Reinforcement Learning", Nature, 518(7540), pp. 529, 2015.

Pei et al., "Mining Sequential Patterns by Pattern-Growth: The Prefixspan Approach", IEEE Transactions on Knowledge and Date Engineering, 16(11 ), pp. 1424-1440, 2004.

Saputra, "Mining Sequential Patterns Using 1-PrefixSpan", Proceedings of World Academy of Science, Engineering and Technology, vol. 26, ISSN 1307-6884, pp. 499-504, Dec. 2007.

Van Hassel T et al., "Deep Reinforcement Learning with Double Q-Learning", Proceedings of the Thirtieth AAAI Conference on Artificial Intelligence (AAAI-16), pp. 2094-2100, 2016.

Xu et al., "Analysis of Web Access Sequence Based on the Improved PrefixSpan Algorithm", International Industrial Informatics and Computer Engineering Conference, pp. 788-791, 2015.

* cited by examiner

| Active window title | Text in | Action duration |
|---|---|---|
| RITM1234 | ServiceNow - Internet Explorer | | 3 |
| ServiceNow - Internet Explorer | | 2 |
| ServiceNow - Internet Explorer | 202 | 1 |
| ServiceNow - Internet Explorer | | 5 |
| Communicator | RITM1234 | 40 |
| RITM5555 | ServiceNow - Internet Explorer | | 20 |
| RITM5555 | ServiceNow - Internet Explorer | 202 | 1 |
| RITM1234 | ServiceNow - Internet Explorer | | 3 |
| EXCEL | RITM1234 | 35 |

| Caseid | Sequence SN |
|---|---|
| RITM1234 | 1 |
| | 1 |
| | 1 |
| | 1 |
| RITM1234 | 1 |
| RITM5555 | 2 |
| RITM5555 | 2 |
| RITM1234 | 3 |
| RITM1234 | 3 |

SYSTEMS AND METHODS FOR ANALYZING AND CONNECTING AUTOMATION SEQUENCES

FIELD OF THE INVENTION

The present invention relates generally to analysis of computer usage and development of automation, in particular to combining related sequences of user actions.

BACKGROUND OF THE INVENTION

Organizations such as call centers, or other businesses, may want to identify sequences of often repeated user inputs or actions, which may be called business processes, in order to create computer automation sequences (where a computer might automatically perform the actions) or to suggest to a user the best next action for the user to take (e.g. enter into a computer program). Such user actions may be human (e.g. user) inputs to a computer, such as clicking on a data entry field, typing in a name, clicking "continue", etc. and may be organized into business. A business process may be a sequence of computer inputs, e.g. actions, where typically the actions are related to the same purpose or goal such as entering a new customer to a system, logging in to a certain application, or finding the status of a customer order. Computerized robots may be processes executed by computers which enter the actions into computer executed applications in place of humans entering the actions.

One of the main building-blocks of automation life-cycle is identifying business processes that are significant candidates for automation, e.g., feasible for automation and have high potential return on investment (ROI) by saving significant manual effort when being handled by robots instead of human agents. Such discovery and analysis process is, in the prior art, done manually and is far from optimal because, for example, the identified flows may be difficult to justify (in terms of profitability and automation ROI); other, more significant, flows can be easily missed; and the discovery process is biased, time consuming and very expensive.

SUMMARY

Embodiments may input or collect a log of all desktop actions performed by a user or employee, and may do this for many different employees. There may be approximately 6,000 such actions on average per employee per eight-hour workday.

Embodiments may automatically identify the most significant business flows for automation and may automatically identify a case ID or ticket ID and use it for connecting actions which are spread across the data and by that to greatly improve any previously achieved discovery results. A case ID may be any number or alphanumeric string identifying a process, such as an order number, a receipt number, a IBAN (international bank account number), a FIN (patient's Financial billing Identification Number), CSN (Contact Serial Number per patient encounter), a user account number, a ticket ID, a case number, or airbill number. Existing approaches cannot group sporadic appearances of sequences that have a gap in between them but relate to the same case ID an agent is handling. Embodiments may identify, in unsupervised machine learning, a set of specific case ID instances and/or the format and syntax of the case ID in the properties of the data.

Embodiments may improve automation by identifying longer and more significant routines than do prior systems. This may be performed based on identifiers or case IDs which typically are only present sporadically in small part of the data. Using the case ID, an identifier which exists in only small part of the data, is different from process discovery techniques that use high-level event-logs and require a Case ID and ActivityID for every action. Embodiments may extract case IDs automatically in an unsupervised manner without customer's intervention, based on case IDs' distinct data characteristics. A memory-state-machine may construct much longer sequences, even where the case IDs do not appear consecutively. Subsequently grouping sequences from different period of time may find relations which could not been found otherwise.

A method and system for analyzing and connecting computer-based actions into sentences may include for a series of computer-based actions, determining the case identifier (ID) for the action for each action where an identifier or case ID can be determined, creating sequences of subsets of the series of computer-based actions using the case ID, and merging sequences having computer-based actions having the same case ID. A set of case IDs may be created or extracted from the actions using a clustering algorithm based on features of potential case IDs such as gaps in appearance of potential case IDs in a sequence of actions and consecutive appearances of potential case IDs in a sequence of actions. The extracted case IDs may be used when creating sequences.

BRIEF DESCRIPTION OF THE DRAWINGS

Non-limiting examples of embodiments of the disclosure are described below with reference to figures attached hereto. Dimensions of features shown in the figures are chosen for convenience and clarity of presentation and are not necessarily shown to scale. The subject matter regarded as the invention is particularly pointed out and distinctly claimed in the concluding portion of the specification. The invention, however, both as to organization and method of operation, together with objects, features and advantages thereof, can be understood by reference to the following detailed description when read with the accompanied drawings. Embodiments are illustrated without limitation in the figures, in which like reference numerals indicate corresponding, analogous or similar elements, and in which:

It will be appreciated that for simplicity and clarity of illustration, elements shown in the figures have not necessarily been drawn accurately or to scale. For example, the dimensions of some of the elements can be exaggerated relative to other elements for clarity, or several physical components can be included in one functional block or element.

DETAILED DESCRIPTION

In the following detailed description, numerous specific details are set forth in order to provide a thorough understanding of the invention. However, it will be understood by those skilled in the art that the present invention can be practiced without these specific details. In other instances, well-known methods, procedures, and components, modules, units and/or circuits have not been described in detail so as not to obscure the invention.

Embodiments may collect actions (e.g. user entry or input to computer programs) and determine or extract, from the collected corpus or DB (database) of actions, identifiers or case IDs appearing in the corpus, and form the actions into sentences (e.g. sequences of subsets of actions which are part of the same business process), in part using the case IDs. A method may connect or group the computer-based actions into sentences by determining or extracting, for each action where or if a case ID can be determined or extracted, the case ID for the action, and creating sentences, e.g. sequences of subsets of the series of computer-based actions, using the case ID. Each resulting sentence includes actions all sharing the same case ID. After a set of sentences is created, pairs or sets of sentences may be merged into larger sentences if the actions within the sentences have the same case ID. Case IDs may be found or extracted from the corpus using a clustering or grouping method over text of the corpus of actions, the clustering designed such that one cluster includes only case IDs: this may be based on the assumption that within the corpus, case IDs have certain characteristics that may be used for clustering the case IDs into one cluster. For example, the clustering may be based on gaps in appearance and consecutive appearances of case IDs in the sequence of actions. The search for case IDs may be based on a format or syntax for case IDs rather than on a set of found case IDs.

A case ID may be a text string (e.g. including letters and/or numbers or other characters) which is used to identify a transaction, event, customer, product, etc., and which may be the identifier which users look to determine what a set of actions or a business process concerns. For example, a case ID may be an account number, or the number of a package being shipped. Case IDs may have certain patterns in action data: e.g. appearing often in a brief sequence then not appearing again; and/or having certain formats. While case IDs are discussed herein, other identifiers may be used to connect actions and sentences. Embodiments may use an identifier (e.g. case-ID) which exists in only small part of the data, where the identifier property can be extended to characterize its containing sequence.

Input to embodiments may be a log or corpus of all desktop actions performed by one or more (typically many) employees, where for each action the collected data contains for example the action data (e.g. mouse or keyboard), timestamp, application context and, where possible, field context. There may be approximately 6,000 such actions for an average employee for an eight-hour work day. Embodiments may identify in an unsupervised manner the existence of case ID in the collected data and use it for connecting actions which are spread around the data which in turn may allow discovery of novel connections of continuous business processes which would be hidden otherwise. Embodiments may use a case ID structure in the user entered actions based on a novel memory state-machine algorithm to discover more significant business processes for automation. Case IDs may be extracted automatically using unsupervised machine learning without customer's intervention by employing their distinct data characteristics.

Prior art attempts process mining include technology such as the Celonis system, the TimelinePI system, the Process-Gold system, and the Minit system, which may identify potential automations based on system event logs, in contrast to embodiments of the present invention, which may use desktop rather than system events. In system event log methods, data is gathered from log events of a specific enterprise application, which is lengthy process, and requires the cooperation of the software developer of the target software application (some of which may not have such logs that can be used). Embodiments of the present invention may instead collect data on its own—not from the target application—from user desktop actions, which are different in format and source from system event logs.

By collecting low-level user actions, embodiments of the present invention may collect all user actions and inputs, regardless of application, and regardless of whether or not the application is an Internet browser-based application, and may not require integrations or interfaces to multiple different specific applications.

In process mining and system event log methods analysis may be on level of step-in-business-process but does not take into the account the actual actions employee has to take in order to complete a specific step in a process. The data in such prior methods may be labeled by definition (e.g. label exists in the data gathered from the event logs) making it simpler to analyze. An advantage of process mining tools may be that they present the organization with a complete end-to-end flow, identifying potential bottlenecks. Disadvantages may include the lengthy process to gather data, the lack of complete data and the disconnection between steps in a flow to what can be automated by robotic process automation (RPA) for each step of the flow, and that customers may need to know in advance which process to analyze, as opposed to embodiments of the present invention which may be unsupervised and may answer the general question of "what should we automate".

Prior process discovery techniques may use high-level event-logs and may require Case ID and activity ID for every action and enforce each action to include such information in its structure as a prerequisite. Embodiments of the present invention may not make such requirements, but may work without high-level system-specific event logs, without being associated to activities or process instances, and instead identify the case ID (e.g. account number, airbill number) from the generic data gathered from desktop events. Prior systems may use high-level system specific event logs which may specifically identify the process or program instance, e.g. a number, and an activity ID (e.g. a unique identifier of each activity in a process) which may specify or identify the task that has been performed by a user or a computer system. In contrast, the low level event data recorded and used in embodiments of the present invention may not be associated with a specific process rather only with a window which has a name and with a program or application operating the window (e.g. an internet browser). The title (e.g., the label displayed at the top) of the screen window, and the name of the program executing with which the user is interacting are data may be extracted or obtained and are different from, the specific identification of the process or program instance which in some cases may not be obtained. Event log data such as an activity ID may be data internal to a program, and may not be provided to other programs; in contrast low level data, desktop events and window names may be more accessible and agnostic to the various programs and applications. Embodiments may discover in an unsupervised manner the case ID format without requiring the customer to define it explicitly. Some embodiments may be agnostic to the domain (e.g. the platform and specific programs as well as customer type, segment market, etc.) and language used for user interfaces, or other data, and may work with any data, for any specific programs the user interfaces with.

High-level system-specific event logs may include activity ID and timestamp. An activity ID may specify the task that has been performed as part of the process. Such data is typically provided by the application itself, and may not be provided for all applications, and thus a process using this data works with incomplete data. Data such as an activity ID, user selection and input may be data internal to a program, and may not be provided to other programs. Current processes analyzing user actions or input do not use accessible low-level desktop events as input data; such low-level data may not be associated with a specific process but rather may be associated only with a window and a program operating the window (e.g. an internet browser). Prior art discovery tools may collect and analyze data based on images, and not on the more technically challenging data collection based on application and application-fields context, and collect and analyze much less data than the improved embodiments discussed herein.

Improvements discussed herein may handle more data, in a sometimes completely unsupervised and unlabeled manner. Embodiments may more effectively, quickly, and with less computational demands identify the most significant automation opportunities.

Actions may be for example both the actual events of a user providing input to a computer and data descriptions of those events such as user desktop event representations: thus in some cases action and event may refer to the same thing. A sentence may be a sequence or a string of user actions that acts as an entire input to perform some business process. These sentences of user actions may act as a combination of several actions that express a particular business functionality.

Events may be generated by users or administrators (e.g., agents of an organization) of client systems or devices, e.g. user terminals, based on input and processing requests to the client devices, such as input and data while performing operations (e.g. user input to applications) on the client devices. An example representation of an action is shown in Table 1; other representations of actions may be used. In Table 1, the action of a user left-clicking (using a mouse, e.g.) on a certain window is shown. The representations in Table 1 may be for example in the form of strings.

(e.g. name or ID of the person providing the input or taking the action in conjunction with the computer); action details, type or description (e.g. mouse-click, left-click, right click, keyboard input, cut, paste, application context, text-input, keyboard command, etc.); the details of the window in which the action takes place, such as the window size, window name, etc.; the name of the program executing the window; field context and text if any that was input or submitted (in text actions). Computer processes in this context may be displayed as windows, each window may have a title or name which may describe the user-facing application to which the user provides input. Action data describing each action may be concatenated to a single string to name the action. Other or different information may be collected.

A generalized name or description may also be created and associated with the action, at various points in the processes described (e.g. sequence mining, automation finding, for processing a general database of user actions, or for processing a set of actions downloaded from a specific agent computer). However, typically, when discovering specific case IDs and finding sentences, un-generalized actions may be used. A name may have certain specific information from the specific action name, such as user ID, timestamp, and other tokens in the data (e.g., names, dates, etc.), removed or replaced with generalized information. Multiple specific instances of similar actions may share the same generalized name or description. Thus actions may be stored and identified by both identifying the specific unique (within the system) instance or name of the action, and also a generalized name or description. Generalization of each action may be done in order to represent actions not specific to one recorded instance. A generalization process may ensure that actions with the same business functionality, or which are functionally equivalent in terms of use, are considered as identical even though they may seem slightly different due to different details such as time or user ID.

An action description may summarize the action's information, but may have unnecessary information (e.g. may be noisy) due to various tokens such as names, addresses, IP numbers, etc. For example, in the two following action descriptions, stored e.g. as strings:

"User InputText(Agent1) on Username in MyOrdering-System-Login-iexplore"

TABLE 1

"teamName": "QA\\\\GROUPA",
"clientID": "TP12_d0a433d289d94745952711c4a4f520f0",
"userName": "User1",
"type": "Click"
"name":"LeftClick"
"actionTime": "2020-06-03T20:32:37.0529169+08:00",
"activeWindow": { "processName":"iexplore", "title":"RITM0080385 | ServiceNow - Internet Explorer"}
"actionComponent": { "Name":"All applicationsFavoritesYour history(tab)", "ControlType":"tab item", "Id":"6","ClassName":""}

Low-level user action information may be collected in the form of handles or objects and their properties as provided by Windows API and other similar APIs (e.g. Win-32 or JVM or others). The event logs files describing these data collected desktop events collected may be exported using JSON (JavaScript Object Notation) files. Other low-level event or action data may be used. The data describing an action may include for example event or action time (e.g. start time, but end time may also be included); user details "User InputText(Agent2) on Username in MyOrdering-System-Login-iexplore"

both represent the same functionality of inserting username (e.g. Agent1, Agent2) in the Username field, but the two descriptions are different as each contains a different name. A generalization process may substitute or replace the certain tokens or data items (e.g., the "name" token) with more general or placeholder descriptions.

Figure 1:
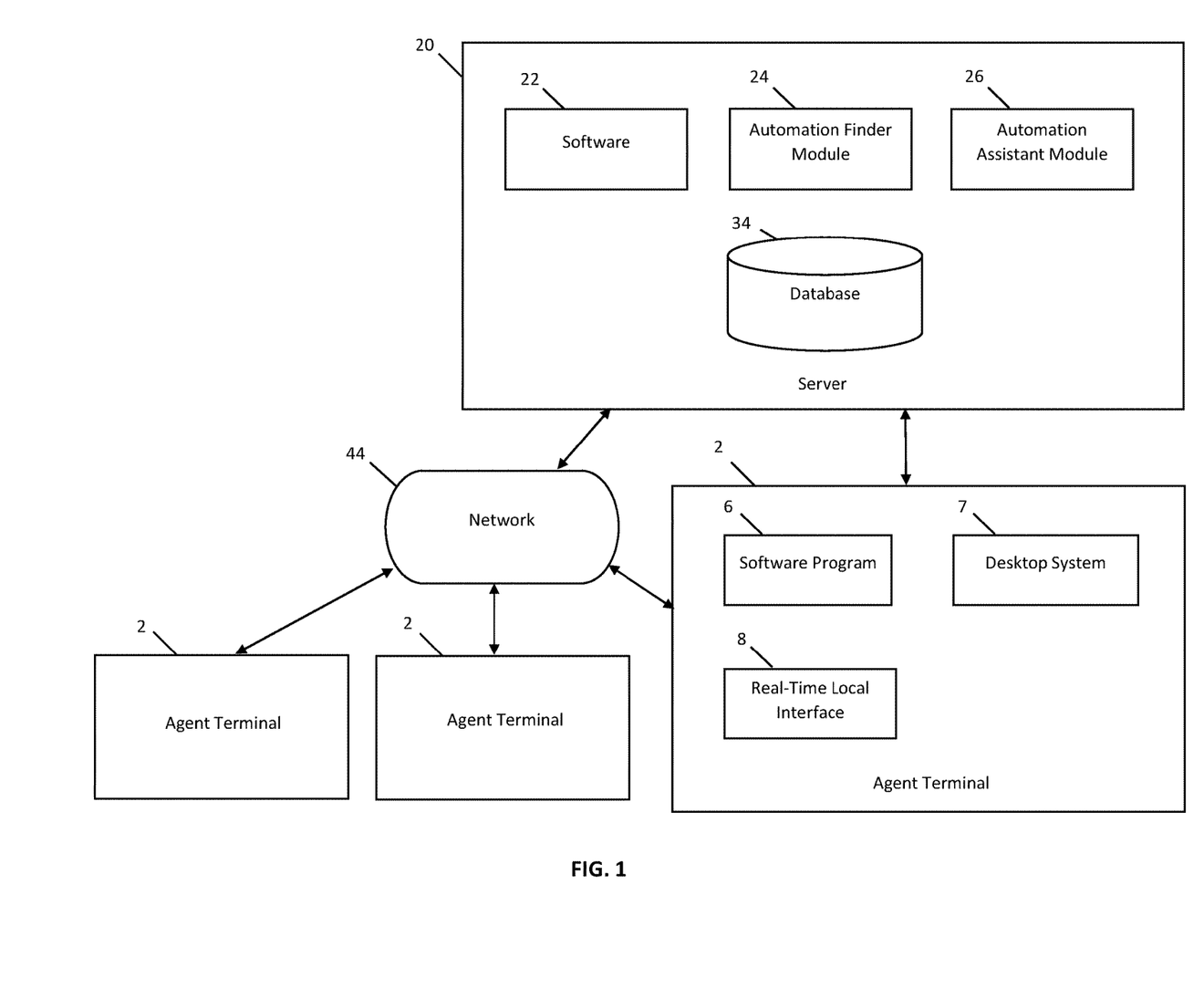
FIG. 1 is a block diagram of a system according to an embodiment of the present invention.

FIG. 1 is a block diagram of a system according to an embodiment of the present invention. While FIG. 1 shows such a system in the context of a contact center, embodiments of the invention may be used in other contexts. A number of human users such as call-center agents may use agent terminals 2 which may be for example personal computers or terminals, and which include one or more software programs 6 to operate and display a computer desktop system 7 (e.g. displayed as user interfaces such as a GUI). In some embodiments, software programs 6 may display windows, e.g. via desktop system 7, and accept user input (e.g. via desktop system 7) and may interface with server software 22, e.g. receiving input from and sending output to software programs 6. A real-time (RT) local interface 8 (e.g. a NICE Attended Robot provided by NICE, Ltd.) executing on terminals 2 may collect user action data, execute an automation sequence in place of user input or provide or display a recommended next action to a user, according to automations created.

RT local interface 8 may act as desk-top monitoring or client data collection software such as an activity recorder or action recorder and may monitor input to programs 6. For example RT local interface 8 may receive or collect a user's desktop activity or actions, e.g. low-level user action information or descriptions, and send or transmit them to a remote analytics server 20 (e.g. as JSON or other files), which may also function as e.g. a NICE RT™ Server. RT local interface 8 may access or receive information describing user input or actions via for example an API (application programming interface) with the operating system and/or specific applications (e.g. the Chrome browser) for the computer or terminal on which it executes. Data such as Win-32 event logs of user's actions may be received or loaded from, e.g. RT local interface 8 and the various fields may be extracted and stored in a database. An analytics server 20 may host an automation finder module 24. Software 22 executed by analytics server 20 and programs 6 may interact in a client-server manner. Remote analytics server 20 may collect or receive data such as user action information or descriptions and transmit or export them to for example a database 34. Automation module 26 may provide useful output based on automations, for example a next suggested action to a user, or a set of actions to operate a program on terminals 2.

One or more networks 44 (e.g. the internet, intranets, etc.) may connect and allow for communication among the components of FIG. 1. Terminals 2 and server 20 may include some or all of the components such as a computer shown in FIG. 5.

An agent operating an agent terminal 2 typically performs business processes, and may have business processes recorded by, for example, by RT local interface 8 from other modules discussed herein, and sent to automation finder module 24.

Automation finder 24 may identify automation opportunities by discovering repetitive sequences of actions, e.g. based on sentences, for example using desktop analytics and machine-learning. Automation finder 24 may include an artificial intelligence (AI) server or capability and other functionality discussed herein such as a clustering module and a case ID parser or text search process. Automation finder 24 may preprocess collected low level actions or events; and form, segment or split (typically in an unsupervised manner) the stream of user actions into sentences each forming a segment, possibly bounded by time, of actions that form a sequence of a subset of the user actions. Identified sentences may describe an instance of a task. From sentences, repetitive sequences may be identified which may be those sequences that have corresponding user actions that are consecutive and/or within the same time frame and are repeated within a stream of user actions. Automation finder 24 may perform sequence mining, sequential pattern mining, finding repetitive sequences in data that contains a set of sentences; and a find process function, grouping the previously found sequences into processes, each process potentially describing a business process. The sequences may be filtered to identify the best ones of those sequences that have the highest ROI. Once significant ones are identified and named, those may be used to build one or more templates that permit entry of dynamic text when form filling or otherwise executing a business process. Automation finder 24 may find processes by grouping previously found sequences or sentences into processes, each process potentially describing a business process. Automation finder 24 may display analytics such as findings as a set of sequences with automation potential, aggregated data per identified sequence and lists of instances per sequence.

While specific functionality is assigned to specific modules, in other embodiments other modules may perform functionality described herein.

A corpus or database of actions may be collected, typically for a certain user, organization or customer (user or customer in this sense being the organization whose agents create the actions, in the case of a server providing services to more than one organization). Typically, only one organization or customer's actions are processed at once, since case ID format may differ among organizations. The actions may be preprocessed, e.g. converted to or represented as a string or another form, sorted, and/or other preprocessing may be performed.

Prior to assignment of sentences to actions and prior to each action being searched over for a case ID, specific case IDs or a case ID format may be extracted from the entire collection or corpus of case IDs. A collection of case IDs or instances may be extracted from the corpus, or the case ID format may be determined, for example by a clustering algorithm, by other automatic analysis, or having a user provide a format. The actions from the corpus or database may be processed and sentences may be identified. Actions in a corpus can be performed by multiple users, thus each action may contain a user attribute or ID. Actions may be grouped by their user attribute and sentences are built separately for each user. Each action's text attributes may be searched, e.g. using a case ID parser or text search process, for an appearance of a case ID instance (e.g. 'RITM1234'). For example, every word in a searched action text property may be compared to the whole case ID collection found for the corpus of actions. Typically, the action text searched or parsed to determine if it contains a case ID instance is the title of the action's window and the text (e.g. keyboard, copy/cut and paste) action properties; however other action properties or text may be searched over. When an action's text attribute contains a matching instance of a specific known case ID or instances appearance or format according to the corpus's or customer's case ID syntax format, the action's case ID attribute is filled with the matched instance. For example, a list or collection of specific, known, case IDs may be created, and a text search may be used to search for these case IDs in the text of the actions.

In one embodiment, user actions may be processed taking into account the time difference between user actions, as a large time difference between sets of actions may indicate the sets of actions are part of a different business process.

Thus in order to determine user action sentences, e.g. to form sentences from a stream of user actions, time difference between actions may be used. Time difference may also be used to assign a case ID to actions or sentences to actions. A high time difference between subsequent user actions may imply that a user transitioned to another or different business functionality, such that the user is executing a new or different business process. A time difference amount or threshold may be set by the system or an administrator, or learned based on time differences (e.g., analyzing differences between action time and another time) in the specific user event log input and/or across all event logs.

In one embodiment, if there is not a large time gap between two actions and the latter action lacks a case ID (e.g. parsing the case ID could not find a case ID) the latter action is assigned the sentence ID of the earlier action. In the same situation, a large time gap could cause the sentence number to be incremented across the actions: the latter action is assigned a sentence number of the previous action's sentence number plus one. A group of actions where two actions have the same sentence number and actions in-between lack a sentence number, the sentence number of the two bracketing actions may be assigned to the in-between actions. A time difference may also be used with a specific time period or frame in which all input and desktop events are required to be detected so that sentences that are too long may be omitted.

During a sentence segmentation process, actions may be processed and sentences may be identified by iterating over the database of event logs or actions. Sentences may be labelled using, e.g. numbers, and those sentence labels may be used or assigned to segment actions into sentences, by assigning each action to a sentence label. While iterating over actions in the preliminary processing phase, a state machine may examine the action's properties and deduce the action's sequence, serial or sentence number, which in one embodiment is an incremental property maintained within the state machine. The sentence number may remain static while iterating and while assigned to actions. It may be changed, e.g. incremented, when a condition associated with determining that the next action does not belong to the current sentence (the current sentence containing the previous set of actions), is met.

The case IDs extracted from specific actions during iteration may be used both to assign a case ID to actions where parsing cannot find a case ID and to assign actions to sentences. An example pseudocode block to assign sentences to action is shown below in Tables 2 and 3. Prior to carrying out operations as in Tables 2 and 3, actions may be preprocessed, e.g. sorted first by user and second by time of the action (e.g. timestamp per the action), to create a stream of actions in blocks according to each user, within each block actions of the same user being sorted by time of action.

Sentences may be associated with a case ID via each action, where the action includes as an attribute or is assigned in a database a case ID and sentence number, or sequence or sentence counter, where the sentences are ordered sequentially. Thus a series of actions A, B, C, D, each having sentence number 3, may form the four actions in sentence 3. A state machine, an example of which described in Tables 2 and 3, may use the case ID and other properties to determine every action's "sn_counter" or sentence counter when iterating over all the actions. Different sequences of actions or sentences may be merged or combined to larger sentences or sequences by for example taking actions with the same case ID, sorted by time to create a larger sentence.

A process such as one shown in Table 2 and Table 3 may, for each action, automatically enter a case ID if no case ID exists, and use the case ID to identify connections between actions or sequences of actions that otherwise seem unconnected. For example, if a human user is tracking a bill, handles an unrelated task, then goes back to tracking the bill, the two separated sequences of actions regarding the bill may be merged using the case ID (e.g. an airbill number) associated with the bill. Prior to iterating over the actions to assign case IDs and sentence numbers, the actions may be searched over using a set of known case IDs extracted from the corpus of actions, or parsed using a case ID syntax or format, to find, for actions where it can be found, a case ID within the text representation of the action (e.g. within a window title, or other field). In one embodiment, a set of specific known case IDs is extracted from the corpus of actions and used to search within individual actions in the corpus using for example text searching, but alternately a format (e.g. regex such as /^RITM([0-9]+)$/) of case IDs may be determined, or may be input by a user.

In addition to a process such as one shown in Table 2 and Table 3, heuristics or rules may be used to combine actions into sentences. For example, if a process detects a copy or cut action, the related paste action could be deemed to belong to the same sentence even if the time difference is higher than the regular time gap threshold-between the actions and a higher copy-paste-time-gap threshold is not exceeded.

Figure 2:
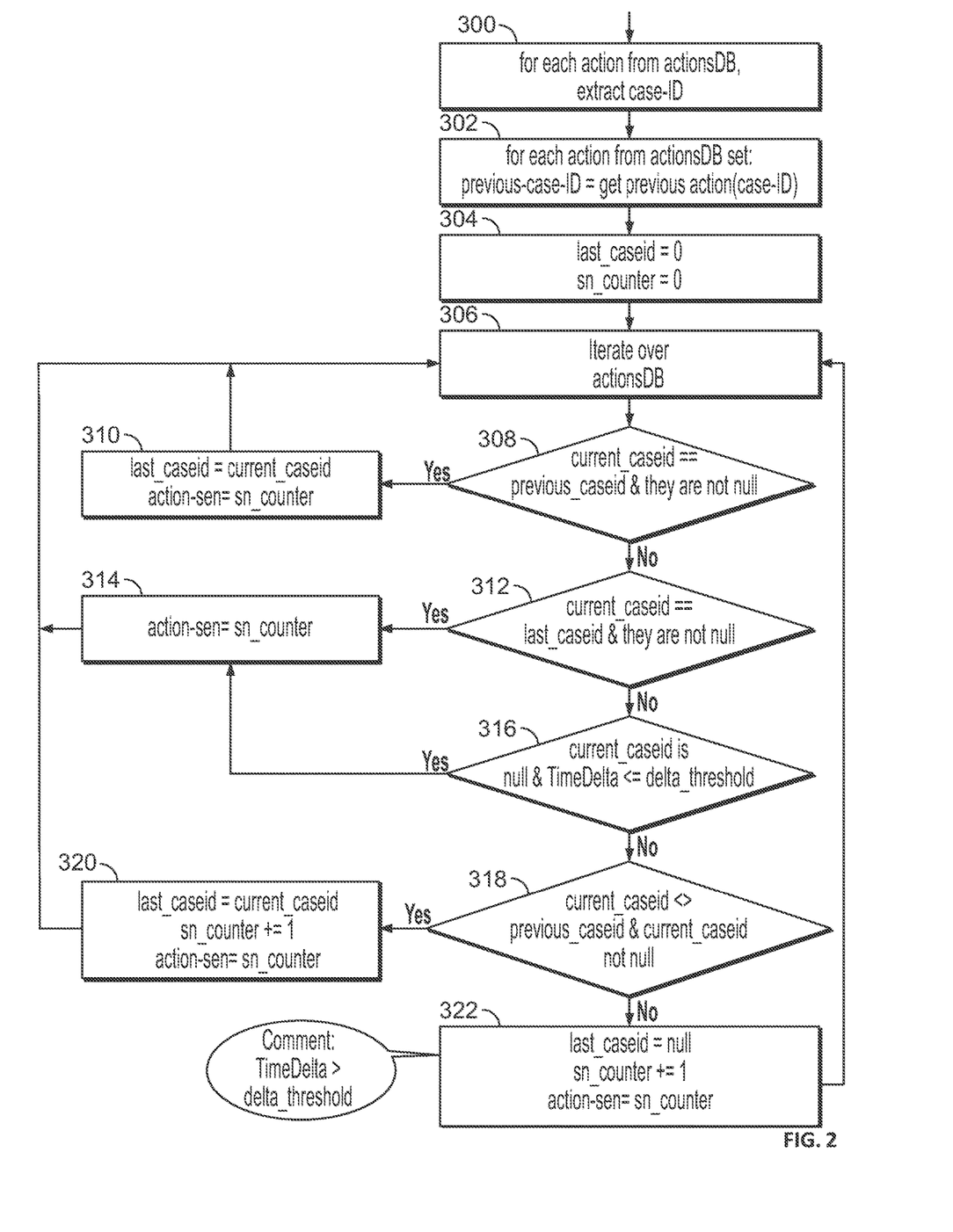
FIG. 2 depicts an example method according to embodiments of the present invention.

FIG. 2 depicts an example method according to the description in Tables 2 and 3, according to embodiments of the present invention. The Tables 2 and 3 pseudocode may act as a state machine maintaining two states:

last_caseid—the last case ID encountered, when iterating over actions; may be initialized 0 before iterating over actions sn_counter—the sentence number to assign, at every given iteration; may be initialized 0 before iterating over actions First, as in example Table 2, for every action, the current case ID and the case ID of the previous action may be extracted (e.g. by parsing or analyzing action text using case IDs identified from the corpus), and assigned, per the Table 2 example pseudo code:

TABLE 2

For each action in actionDB: // attributes for each action are set
    Set: current_caseid = parse from action fields // case ID for current action being analyzed; unsuccessful extracting or parsing may result in an empty or null case-ID; operation 300 in FIG. 2.
    set: previous-case-ID = get previous action(case-ID) // attribute for each action, the attribute being the case-ID of the immediately previous action; operation 302

The sentence number (e.g. a counter) for each action may be determined per the example pseudo code in Table 3 (values may be initialized at operation 304 in FIG. 2):

TABLE 3

For each action in actionDB: // iterate over all actions, returning a sentence number for each action, operation 306 in FIG. 2.
    if current_caseid == previous_caseid and current/previous_caseid <> null //
if two actions in sequence have, per parsing, same case ID and if both current and previous case ID are not empty; operation 308
        last_caseid = current_caseid // last_caseid records the last
      case ID seen; operation 310
        return sn_counter (same sequence) // set sentence counter for
        current action to be same sentence as previous action; "return" ends
        process and returns a sentence number, preventing following if-
        thens from executing
    if current_caseid == last_caseid and current_caseid <> null // if continuity in case
ID, e.g. if per parsing current action's case ID is same as the state variable last case ID; operation 312
        return sn_counter (same sequence) // set sentence counter for current
        action to be same sentence as previous action; operation 314
    if current_caseid == null and TimeDelta <= delta_threshold: // operation 316
        return sn_counter (same sequence) // set sentence counter for
        current action to be same sentence as previous action if current
        action lacks case ID per parsing and time difference from previous
        action not greater than threshold; operation 314
    if current_caseid <> previous_caseid and current_caseid <> null // operation 318
        last_caseid = current_caseid // operation 320
        sn_counter += 1 (new sequence) // if case ID changes
      between actions, increment sentence for new sentence
        return sn_counter
    // we reached here (code below) since, TimeDelta > delta_threshold
    last_caseid = null // operation 322
    sn_counter += 1 (new sequence) // new sentence & clear last case ID if large time
between actions and the case ID between actions was different
    return sn_counter Returning a sentence number may cause an action's sentence number attribute to be set to that sentence number. The example pseudocode in Table 2 and Table 3 may correspond to five example conditions in Table 4 below. When the first condition in any of the five conditions is met, according to order, it may determine the sentence number and state, and the next conditions are not evaluated and the state machine proceeds to the next action through iteration:

TABLE 4

1. The sentence number remains as is, if the current case ID is the same as the previous case ID (e.g. if two actions in sequence have, per parsing, same case ID)
    a. last_caseid state is set to current case ID
2. The sentence number remains as is, if the current case ID is the same as the last case ID (e.g. if per parsing current action's case ID is same as the state variable last case ID)
3. The sentence number remains as is and is assigned to the current action, if the current case ID empty after parsing (e.g. a text search finds no known case ID) but the action time is within the threshold time-window from the previous action
4. The sentence number is incremented, if the current case ID is different from the previous case id
    b. last_caseid state is set to current case ID
5. The sentence number is incremented, since past conditions were not met, thus action time is above the threshold time-window from the previous action
    a. last_caseid state is reset to null After iterating over actions to assign sentences, each sentence (e.g. via the sentence being an attribute of actions) may now be associated with a case ID, e.g. have a case ID attribute. A sentence's beginning or start time (e.g. the timestamp of the first action in the sentence) may be used as the time of the sentence. Using this data, sentences having the same case ID instance may be grouped by case ID and sorted by time.

Sentences may be extracted, for example by sorting actions using sentence number and other information. Other methods of extracting sentences may be used; other data structures may be used to associate sentences, actions, and case IDs.

In one embodiment, after iterating over actions, each action may have a sentence number property, e.g. sn_counter. Each action may have a case ID property, in the event a case ID was parsed from the action. All actions having the same set of attributes may be grouped together, for example using attributes user-name, case ID, and calendar day (e.g. taken from the time-stamp). Each resulting group of such actions can be assumed to have been performed by the same desktop user, at the same day and have the same specific case ID instance appearing in them. The set of unique sentence numbers appearing in each such group may be associated together and may receive the same new merged sentence number. For example, assuming action1 and action2-action6 all have sn_counter 1 and action34-action39 have sn_counter 8; action2 and action36 both have the same case-id='RITM8734' and have sn_counter 1 and 8 respectively. Thus all actions with sn_counter 1 or 8, will be merged and receive (e.g. via changing the attribute of the relevant actions) a new sentence counter or the sentence counter of one of the sequences, e.g. sn_counter 1. The effect of merging may be that two whole 'sentences', receive the same sn_counter. In some embodiments, while initial sentences are formed from actions from only one agent, sentences from different agents having the same case ID may be merged to one sentence, for example in the case of two agents handling the same matter across different shifts.

Figure 3:
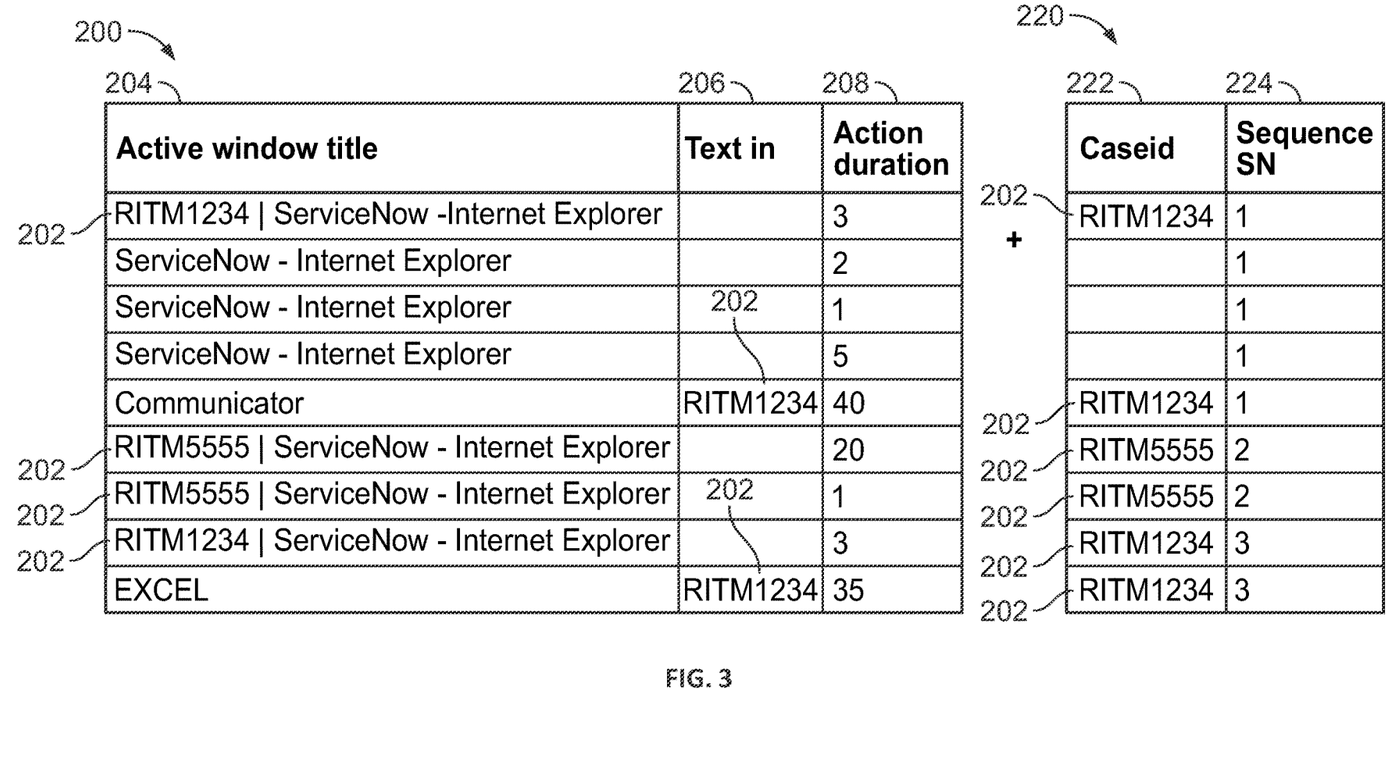
FIG. 3 depicts a set of actions in a first table or database and a second table associating actions, case IDs, and sentences, according to one embodiment of the present invention.

FIG. 3 depicts a set of actions in a first table or database and a second table associating actions, case IDs, and sentences, according to one embodiment of the present invention. Tables 200 and 220 may form one table, where case-id and sentence-number attributes are columns populated when iterating over the actions corpus e.g. using a state machine. Table 200 depicts a series of actions 202, each with attributes such as the title of the window 204 in which the action takes place and text entered by a user 206, if any, and an action duration 208. An action duration may be, for example, the time period (e.g. in seconds) that passed from the beginning of the current action until the beginning of the next action if performed by the same user. Table 220 includes, for each entry corresponding to an action in table 200, a case ID 222 if able to be parsed or extracted from the text of the action, and a sequence or sentence number 224 assigned by a process as described herein. In the specific example shown, a process may merge actions having sentence numbers 1 and 3 into a newly numbered sentence, as these actions share a common case ID.

Independent from the sentence building and merging, a preliminary phase may be performed in order to extract specific identifiers such as case IDs, or the case ID format, e.g. 'RITM1234' ('RITM' followed by 4 digits). While case IDs are discussed herein, other identifiers may be determined or found, and used to connect actions and sentences.

The specific instances of case ID or the case ID format can then be used by text searching, or parsing or text analysis in order to identify case ID appearances in the sentence building and merging phase and to extract actual case IDs. This may be performed by analyzing the raw action data before generalization, for example using ML to identify probable words in the actions' text corpus, represent statistical features for each word, cluster them (e.g. according to similar features), and identify the cluster containing the case ID words, e.g. according to its statical traits, thus inferring what words represent the case ID.

To extract a case ID format, actions may be processed to produce a text dictionary or database of strings or text representing the actions. Within this dictionary, text may be divided into fields or sub-properties. A dictionary may be created including words or text from the actions' sub-property 'title' in the 'active window' property. Inverse document frequency (IDF) criteria filtering may be performed on this dictionary of titles to create a reduced dictionary, and a specific set of features for each word in the dictionary may be calculated. A distance D between each pair of words from the dictionary may be calculated and may be placed in a structure such as a distance matrix, e.g. using a formula receiving the two words' features as parameters. Clustering of the words may be performed, e.g. based on features of the words. The cluster with best 'compactness' may be chosen and the members of the cluster may form a set of case IDs used to search over actions; alternately the cluster may have extracted from it the case ID format.

A word database or dictionary may be created by processing all collected actions. For each action an 'active window' property, or another property describing the screen window in which the action takes place (e.g. in which the user is entering data or a command) is accessed and from that property the 'title' sub-property (e.g. the title of the window) is extracted or parsed. The title string may be parsed or split into individual words, and every new encountered word is entered to the dictionary. In one embodiment, when analyzing a corpus of actions to identify case IDs (prior to searching for those case IDs), a different set of action text may be used than the text used for searching for specifically identified case IDs in a specific action. For example, a database of case IDs may be created, or the dictionary may be built for case ID extraction, using only actions' titles from the window property. In contrast, when assigning a case ID property to an action after case IDs have been extracted from a corpus, searching in an action may be performed on the title of the window and the text (e.g. keyboard, copy and paste or cut and past) action properties. However, other text may be searched over in actions. Other text or data may be used to identify instances or formats for case IDs.

This created database or dictionary typically contains only action window titles, or words taken from titles. Within this database, every action's window title (e.g. the title of the window in which an action takes place) may be processed as a "document" (in the context of IDF scores) and its inverse document frequency (e.g. IDF score) may be computed across all, or relative to all, of the documents (e.g. all of the actions corpus's or database's titles). Each word in the database, t, may receive its score, for example according to the example formula:

$$IDF(t, D) = \log \frac{N}{(1 + |\{d \in D : t \in d\}|)}$$

Where:

N—total number of documents in the corpus; N=|D|

|{d∈ D:t∈ d}| is the number of documents across all the documents in set D, where the term or word, t, appears.

Other formulas may be used. Then, the words with a low IDF scores and high IDF scores may be removed from the dictionary, for example according to percentiles, e.g. words removed may be above and below a certain percentile of IDF score. The remaining words compose the reduced dictionary. Removing low and high frequency words may remove words less likely to be case IDs: very common words such as "Chrome" (the name of a browser) are unlikely to be case IDs; extremely rare words such as specific monetary amounts are unlikely to be case IDs.

For every word or term in the reduced dictionary (having words with low and high IDF scores removed) features or characteristics may be computed or determined; these features may be used to cluster or group the words, e.g. potential case IDs. Among the features or attributes used to cluster may be gaps in appearance of potential identifiers or case IDs over a sequence of actions and consecutive appearances of potential case IDs over the sequence, and shared characteristics of the format of the case ID (e.g. ratio of letters to numbers, length, etc.). As a preliminary step for computing the features or characteristics, the actions may be scanned in the order they occurred, e.g. timestamp order after having been sorted by agent. For every word in the dictionary, a list of consecutive appearances in the list of actions sorted by user or agent first and then by time (e.g. a word or term's appearance in a string representing an action) and a list of gaps may be compiled for the sake of temporal features, for example, within the sorted list of collected actions used to build sentences. Each action may have an associated set of consecutive appearances and set of gaps, each set a sequence of numbers:

Consecutive appearances—a sequential list of numbers, each number representing the number of actions where the same word or term appeared, consecutively in immediately previous subsequent actions' titles, in actions in the sorted list of user actions. E.g. if the word appeared in four immediately subsequent actions and then after some gap in another seven immediately subsequent actions, then the list of consecutive appearances may be [4,7]

Gaps—When the previous action title in the sorted list of actions does not contain the same word, the number of previous actions, not containing the word, since the last appearance of the same word in an action title. A list of gaps associated with each action may be a sequential list of numbers, e.g. [3, 4, 10], each number representing the number of actions prior to an instance of the action title for that action where that title did not appear.

Each action may have a set of gaps and consecutive appearances, each set of gaps and consecutive appearances being a list of integers. Every word or term in the reduced dictionary may receive a set of scores or ratings, e.g. one score for each the following example features (different sets of features may be used):

1) Mean (consecutive appearances)—the mean of the list of consecutive appearances for the word
2) Median (consecutive appearances)—the median of the list of consecutive appearances for the word
3) Standard deviation (consecutive appearances)—the standard deviation of the list of consecutive appearances for the word
4) Max (consecutive appearances)—the maximum value in the list of consecutive appearances for the word
5) Min (consecutive appearances)—the minimum value in the list of consecutive appearances for the word
6) List-size (consecutive appearances)—the number of times consecutive appearances occurred. For example if the word appeared four times subsequently and another time seven times, then the List-size sum=2, since there were only two bulks of consecutive appearances
7) Mean (Gaps)—the mean of the numbers appearing in the list of gaps of gaps for the word
8) Median (Gaps)—the median of the list of gaps of gaps for the word
9) Standard deviation (Gaps)—the standard deviation of the list of gaps of consecutive appearances for the word
10) Max(Gaps)—the max of the list of gaps for the word
11) Min(Gaps)—the min of the list of gaps for the word
12) List-size (Gaps)—the number of times gaps for the word occurred, e.g. the number of integers in the list of gaps
13) Count—total number of actions (e.g. in the original corpus, e.g. the sorted list) the word appeared in
14) Word length—the number of characters in the word
15) Alpha-to-alphanumeric-ratio—the number of letter characters divided by the number of alpha-numeric characters in the word
16) Numeric-to-alphanumeric-ratio—the number of numeric characters divided by the number of alpha-numeric characters in the word Some characteristics may be used to determine temporal characteristics, as case IDs may appear in "bursts" in sequences of actions, e.g. may appear in a row a number of times then not appear for a time. Case IDs may share characteristics, e.g. number to alphanumeric ratio, pattern of appearance, and may be clustered based on shared characteristics.

Distances between each pair of words in the reduced dictionary may be calculated. For example, a distance matrix of distance D between each pair of words from the dictionary may be created. The distance D between two words may be computed using a formula receiving the two words and its features as parameters. In one embodiment, for each pair, first, the Levenshtein distance or edit distance, L, between the two words is calculated. The Levenshtein distance is a string metric for measuring the difference between two sequences or strings, and may be the minimum number of single-character edits (e.g. insertions, deletions or substitutions) required to change one word into the other. For example, three edits are needed to change kitten to sitting, and thus the Levinshtein distance between kitten and sitting is 3. After this, for each pair of words, $W_1$, $W_2$, $\Delta F_i$ is calculated as the difference between the two words' $i$-$^{th}$ feature, $F_i(W)$:

$$\Delta F_i = |F_i(W_1) - F_i(W_2)|$$

$\Delta F_i$ may be calculated for each of the features (e.g. the 16 features described above, or different features). The distance D between two words $W_1$, $W_2$ may be calculated computed as a weighted sum of L (using weight $P_l$) and the delta features, $\Delta F_i$, where each feature may given a different weight $P_i$:

$$D(W_1, W_2) = P_l * L + \Sigma P_i * \Delta F_i$$

Other methods of calculating a distance between a pair of words may be used.

Based on features or characteristics of the words in the reduced dictionary, the words may be grouped or clustered, to partition the words into groups having similar traits. A K-means clustering algorithm may be used, but other clustering algorithms may be used. For a clustering algorithm each word may be represented using, for example, a scaled and weighted f-dimensional vector (f being the number of features) of the above features. The features may be weighted, for example, using the same weights $P_i$: as used to calculate distance D. For example, a feature vector for a word may be:

$$\{P_1 * F_1, P_2 * F_2, \ldots\}$$

Where Fx are features for the word and Px is a weight applied to the Xth feature in the vector. In one embodiment, every word in the dictionary, e.g. 'Close/Cancel', 'Collaboration', . . . 'RITM8734', 'RITM5711', etc. receives 16 features describing format-syntax aspects {F1, F2, . . . F16}. Other numbers of features may be used. These 16 numbers (possibly factored by weights such as Pi) form the d-dimensional vector.

Given a set of words each represented by a d-dimensional real vector, k-means clustering may partition the words into k($\leq$n) sets or clusters S={$S_1$, $S_2$, . . . , $S_k$} so as to minimize the within-cluster variance between the vectors of each word. Other clustering methods may be used.

After creating groups or clusters, the cluster including the case IDs or identifiers may be selected. An improved clustering process according to some embodiments may, without user intervention or direction, and without a-priori knowledge regarding the format of case IDs, find case IDs in actions. A process may select the cluster with a smallest compactness score, e.g. the smallest mean distance between members, as the cluster including all case IDs (typically no other cluster will include a case ID). One embodiment may use a Levinshtein distance as the measure to evaluate clusters, e.g. determining the Levinshtein distance among all pairs within each cluster, or using the distance matrices, then averaging all the distances within each cluster, then picking cluster with minimum average distance as the cluster including case IDs. Other methods of evaluating clusters may be used. The most compact cluster, having the lowest compactness score, may indicate the cluster or group which has the most similar members in feature terms. A cluster group containing words, or containing a large number of words, that are instances of a case ID format may exhibit low variance and best compactness. Other compactness measures may be used.

The distance matrix may provide the distance for any pair of words. A formula for calculating the mean of differences between all the pairs of words appearing in a cluster group may be, for example:

for every 2 words in cluster C, $\{W_1, W_2 \in C\}$,
N, number of words in Cluster:

$$\text{Compactness}(C) = \frac{\sum D(W_1, W_2)}{N}$$

Where D is the distance between two words $W_1$ and $W_2$. From the chosen most compact cluster, a certain number, e.g. 100, of top case ID instances (e.g. which have high frequency in the raw data from the original corpus of actions) may be retrieved for validation of the cluster. Validation may be also performed by examining a sample of a certain number of (e.g. 100) case ID instances that appeared in the most number of actions: e.g. case-id instances such as 'RITM8734' that re-appeared in the highest number of action instances: e.g. the top X case IDs appearing in the most action instances. These top X case IDs may be analyzed. Validation may, for example, analyze the members of the cluster, or the top X members or case IDs in the cluster, against a specific format or criteria. For example, a cluster may be validated as being the cluster by validating that the case ID instances in the cluster include at least X digit characters. This may involve reviewing the top X case IDs in that cluster to see if each contains at least X (e.g. X=5 in 'RITM10234') digits within the term. Other validation methods may be used.

If the validation fails, it can be assumed a case-ID cluster was not found, and case-ID is not used in the discovery: the conclusion may be that there is no case ID in the corpus. If case IDs do appear in the data, the chosen cluster, with a minimum compactness score, should contain them and only them.

Optionally, a case ID regex expression may be provided, e.g. by a user, to be used by the case ID parser for searching in each action's text attributes.

The entities within the chosen or validated cluster, which should contain only case ID instances, possibly thousands or other numbers of instances, may be used to populate a list of specific case ID instances to be used to search the corpus of actions. A database or set of all the case ID instances discovered may include, for example a large collection including for example, [RITM8734, RITM5711, RITM430214 . . . ] or [TICKET-3401-AG, TICKET-2943-DA . . . ]. Alternately, from the chosen cluster, the format or syntax of the case ID may be determined. A cluster's collection of case IDs may be used to search for case ID matches in action properties. Thus in some embodiments an automatic process finds a specific set of case IDs or the case ID format for the user, without having to be told what the possible format is.

Figure 4:
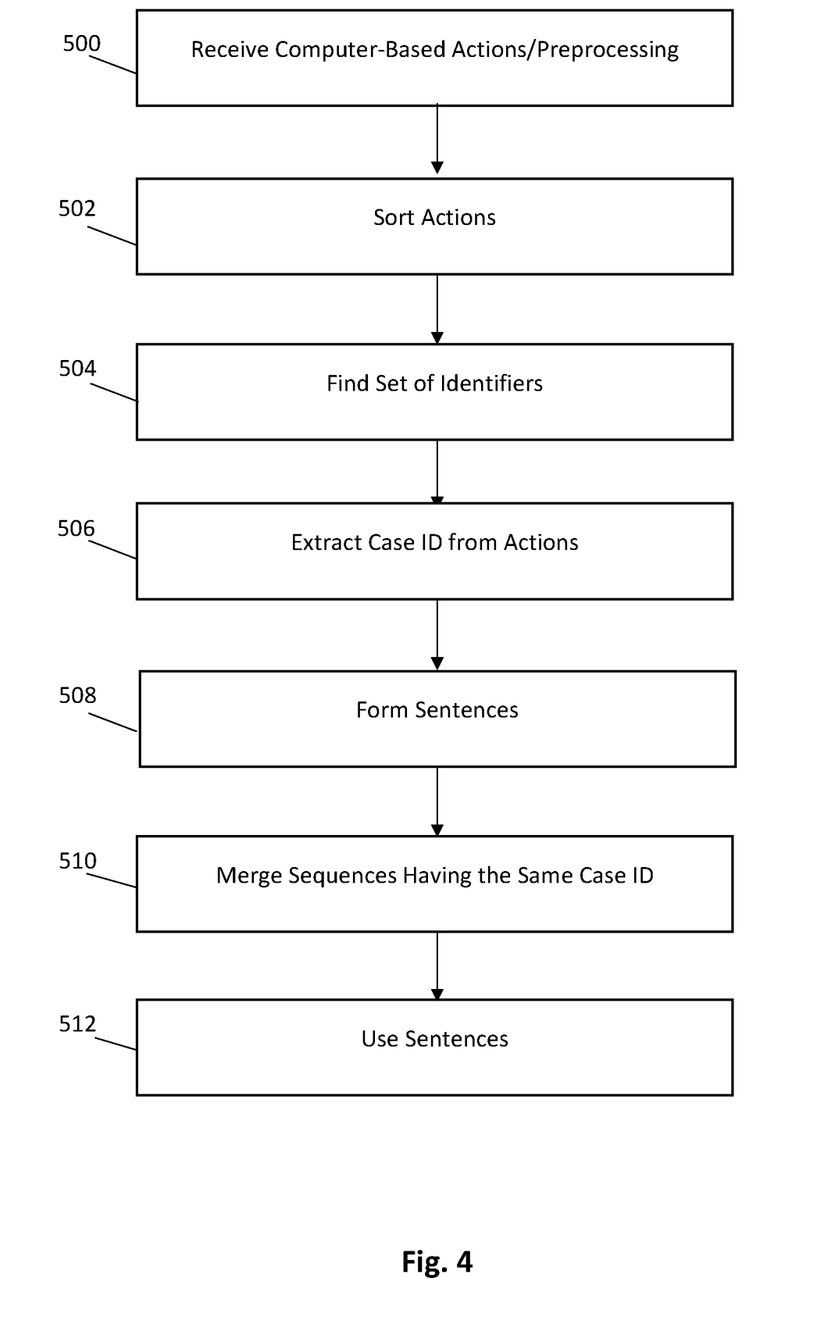
FIG. 4 is a flowchart of a method according to the present invention.
Figure 5:
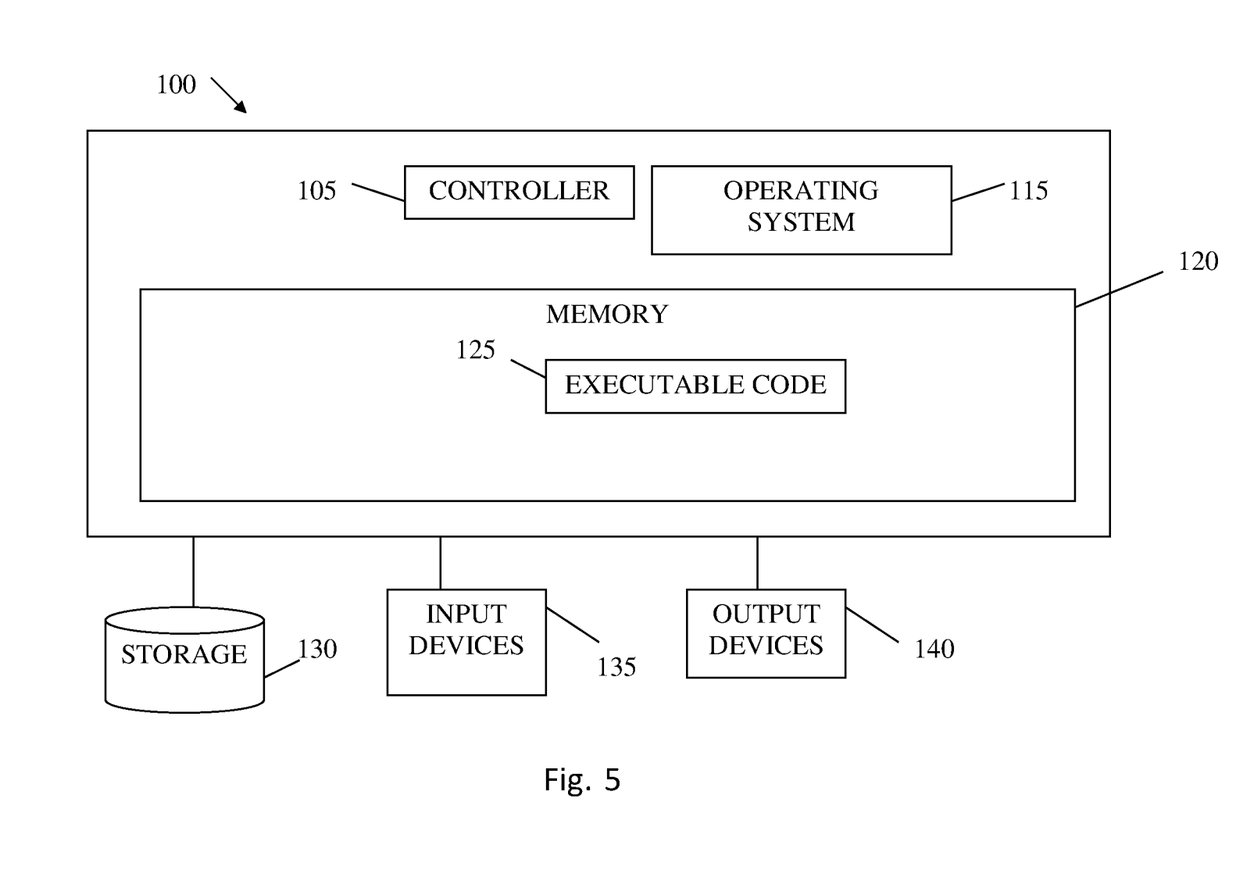
FIG. 5 is a high-level block diagram of an exemplary computing device which may be used with embodiments of the present invention.

Table 5 includes sample pseudocode for a process to find a set of case IDs, e.g. a list Caseid_list of specific instances of case IDs; other code may be used:

TABLE 5 title_dict = dict( )
For each title in activeWindowTitle: // in a set of active window titles, e.g. a dictionary of
actions' sub-property 'title' in the 'active window' property
   title_dict ← Maintain a list of the number of successive appearances, a list of numbers
each number representing a stream of consecutive appearances of the string, e.g. title['tltle12']
= [6,9,2,1]
words_idf_dict ← Compute inverse document frequency (IDF) of each word across all active
widows title
words_idf_dict_filtered ← Remove words with low and high IDF from words_idf_dict #
according to percentile
For each item in title_dict:
   item ← remove words that do not appear in words_idf_dict_filtered
   if item containing a single word:
     title_dict_new ← item
For each item in title_dict_new compute the mean successive appearances # e.g. 18/4 ←
[6,9,2,1]
Compute Levinshtein distance matrix for all items in title_dict_new
Compute agglomerative clustering (average linkage)
For each cluster compute the mean of "the mean successive appearances"
Candidate_cluster ← Choose the cluster having the min(mean of "the mean successive
appearances")
Caseid_list ← Candidate_cluster words FIG. 4 is a flowchart of a method according to the present invention. The operations of FIG. 4 may be performed by systems as depicted in FIGS. 1 and 5, and may incorporate operations as depicted in FIG. 2, but may be carried out by other systems and incorporate other operations.

In operation 500, computer-based actions may be received or collected, e.g. from desk-top monitoring systems (e.g. RT local interface 8 or other systems) executed by computers used by agents. The collected actions may form a corpus of actions, typically from different users, possibly across different days, but typically a corpus is generated from users at one organization. The actions may be preprocessed: e.g. each action may be processed to be represented as a string or another form, and generalized, for use for example in pattern mining.

In operation 502, the series of collected and pre-processed actions may be sorted, for example by user and timestamp, to obtain a first series of a number of second series of actions, each second series of actions performed by one person and typically ordered by time. Typically operations such as sorting, clustering, and sentence identification are performed using non-generalized actions.

In operation 504, a set of identifiers or case IDs existing in the corpus or series of collected actions, e.g. specific instances of case IDs, may be determined, or a format or syntax for case IDs may be determined or provided (e.g. by a user, or pre-set). In one embodiment a clustering method or algorithm as described elsewhere herein may be used. However, other methods of extracting specific instances of case IDs may be used.

In operation 506, for each action in the series or corpus of computer-based actions, a case ID may be extracted or determined (where, or if, for that action that a case ID can be determined); a case ID attribute for that action may be set to the case ID. If or where a case ID cannot be extracted or determined for an action, e.g. a text search cannot find a case ID, a case ID attribute for that action may remain null (and may be later determined using the case ID of another action). In one embodiment a case ID is extracted by using text search to search over the text string representation of the case ID with all case ID instances determined in operation 504; in other embodiments other methods may be used, such as searching using a regular expression, format, or syntax. Extracting a case ID from an action may be based on, e.g. using, a set of case IDs determined to exist in the corpus; for example the set of case IDs for the corpus may be used to search over the text of the specific action being examined.

In operation 508, sentences may be formed, e.g. a process may create sequences of subsets of the series of computer-based actions. Sequences or sentences may be formed using at least in part the case ID attribute of actions.

In operation 510, a number of sequences including computer-based actions having the same case ID or identifier may be merged or combined. Each set of one or more sentences may be combined into one merged sentence. A process such as that depicted in FIG. 2 may be used to perform operations 508-510, although other methods may be used.

In operation 512, use may be made of the sentences produced. For example, sequential pattern mining may be used on the sentences created in operations 500-510 (possibly using generalized actions) in order to find useful or high-value sentences or segments. An automation sequence may be created which may include a series of actions executed by a computer system to substitute for actions taken by a user operating a computer system. Automation sequences may be identified by sequential pattern mining as repetitive sequences having corresponding user actions that are consecutive and/or within the same time-frame and are repeated within a stream of user actions, typically across different users.

An automation sequence may include actions input by a bot to software applications: user left clicks on "ordering system"; user inputs username to username field; user inputs password to password field; user clicks "login". A user may normally perform this sequence of actions, and an automation sequence may have a process on a computer system perform this automation sequence for the user, to automatically and quickly complete the login process for the user. Typically automation actions such as business process actions are performed on screen elements (e.g. buttons, windows, dropdown menus, text entry fields) in various applications.

Other operations or sequences of operations may be used.

FIG. 5 shows a high-level block diagram of an exemplary computing device which may be used with embodiments of the present invention. Computing device 100 may include a controller or computer processor 105 that may be, for example, a central processing unit processor (CPU), a chip or any suitable computing device, an operating system 115, a memory 120, a storage 130, input devices 135 and output devices 140 such as a computer display or monitor displaying for example a computer desktop system. Each of modules and equipment such as a case ID parser process, clustering process, agent terminals 2, software programs 6, computer desktop system 7, RT local interface 8, server 20, server software 22, automation finder module 24, automation module 26 and other modules discussed herein may be or include, or may be executed by, a computing device such as included in FIG. 5, although various units among these modules may be combined into one computing device.

Operating system 115 may be or may include code to perform tasks involving coordination, scheduling, arbitration, or managing operation of computing device 100, for example, scheduling execution of programs. Memory 120 may be or may include, for example, a Random Access Memory (RAM), a read only memory (ROM), a Flash memory, a volatile or non-volatile memory, or other suitable memory units or storage units. Memory 120 may be or may include a plurality of different memory units. Memory 120 may store for example, instructions (e.g. code 125) to carry out a method as disclosed herein, and/or data such as low-level action data, output data, etc.

Executable code 125 may be any application, program, process, task or script. Executable code 125 may be executed by controller 105 possibly under control of operating system 115. For example, executable code 125 may be one or more applications performing methods as disclosed herein. In some embodiments, more than one computing device 100 or components of device 100 may be used. One or more processor(s) 105 may be configured to carry out embodiments of the present invention by for example executing software or code. Storage 130 may be or may include, for example, a hard disk drive, a floppy disk drive, a Compact Disk (CD) drive, a universal serial bus (USB) device or other suitable removable and/or fixed storage unit. Data described herein may be stored in a storage 130 and may be loaded from storage 130 into a memory 120 where it may be processed by controller 105.

Input devices 135 may be or may include a mouse, a keyboard, a touch screen or pad or any suitable input device or combination of devices. Output devices 140 may include one or more displays, speakers and/or any other suitable output devices or combination of output devices. Any applicable input/output (I/O) devices may be connected to computing device 100, for example, a wired or wireless network interface card (NIC), a modem, printer, a universal serial bus (USB) device or external hard drive may be included in input devices 135 and/or output devices 140.

Embodiments of the invention may include one or more article(s) (e.g. memory 120 or storage 130) such as a computer or processor non-transitory readable medium, or a computer or processor non-transitory storage medium, such as for example a memory, a disk drive, or a USB flash memory, encoding, including or storing instructions, e.g., computer-executable instructions, which, when executed by a processor or controller, carry out methods disclosed herein.

Embodiments of the invention may improve the technologies of computer automation, computer bots, big data analysis, and computer use and automation analysis by using specific algorithms to analyze large pools of data, a task which is impossible, in a practical sense, for a person to carry out. Embodiments may enable more effectively, quickly and cheaply identifying automation opportunities, and finding longer routines to automate combined.

One skilled in the art will realize the invention may be embodied in other specific forms without departing from the spirit or essential characteristics thereof. The embodiments described herein are therefore to be considered in all respects illustrative rather than limiting. In detailed description, numerous specific details are set forth in order to provide an understanding of the invention. However, it will be understood by those skilled in the art that the invention can be practiced without these specific details. In other instances, well-known methods, procedures, and components, modules, units and/or circuits have not been described in detail so as not to obscure the invention.

Embodiments may include different combinations of features noted in the described embodiments, and features or elements described with respect to one embodiment or flowchart can be combined with or used with features or elements described with respect to other embodiments.

Although embodiments of the invention are not limited in this regard, discussions utilizing terms such as, for example, "processing," "computing," "calculating," "determining," "establishing", "analyzing", "checking", or the like, can refer to operation(s) and/or process(es) of a computer, or other electronic computing device, that manipulates and/or transforms data represented as physical (e.g., electronic) quantities within the computer's registers and/or memories into other data similarly represented as physical quantities within the computer's registers and/or memories or other information non-transitory storage medium that can store instructions to perform operations and/or processes.

The term set when used herein can include one or more items. Unless explicitly stated, the method embodiments described herein are not constrained to a particular order or sequence. Additionally, some of the described method embodiments or elements thereof can occur or be performed simultaneously, at the same point in time, or concurrently.

What is claimed is:

1. A method for connecting computer-based actions, comprising:
    collecting, by a server, a plurality of computer-based actions recorded from one or more terminals, the server remote from the terminals, the one or more terminals connected by a communication network, and transmitting, by the server, the collected computer-based actions to a database of event logs, wherein the terminals each execute a real-time local interface collecting the computer-based actions input by users to the terminals;
    using a computer processor, for a series of computer-based actions among the collected actions, determining, for each action where a case ID can be determined, the case ID for the action;
    for each computer-based action where a case ID cannot be determined, assigning a case ID to the computer-based action based on a case ID of another computer-based action;
    creating sequences of the series of computer-based actions using the case IDs; and merging a plurality of sequences comprising computer-based actions having the same case ID.

2. The method of claim 1, wherein determining the case ID is based on a set of case IDs extracted from the series of computer-based actions.

3. The method of claim 2, comprising extracting the set of case IDs using a clustering algorithm.

4. The method of claim 2 where determining a case ID for an action comprises searching text representing the action using the set of case IDs.

5. The method of claim 3 wherein the clustering is based on gaps in appearance of potential case IDs in a sequence of actions and consecutive appearances of potential case IDs in a sequence of actions.

6. The method of claim 1, comprising, for each computer-based action where a case ID cannot be determined, assigning a case ID based on a time difference between actions.

7. A system for connecting computer-based actions, comprising:
    a memory; and
    a processor configured to:
        collect, from a database of event logs, a plurality of computer-based actions, the actions recorded and collected from one or more terminals and transmitted to the database, the processor remote from the terminals, the one or more terminals connected by a network, wherein the terminals each execute a real-time local interface collecting the computer based actions input by users to the terminals;
        for a series of computer-based actions among the collected actions, determine, for each action where a case ID can be determined, the case ID for the action, wherein the processor is configured to extract the set of case IDs using a clustering algorithm, the clustering based on gaps in appearance of potential case IDs in a sequence of actions and consecutive appearances of potential case IDs in a sequence of actions;
        create sequences of the series of computer-based actions using the case IDs; and
        merge a plurality of sequences comprising computer-based actions having the same case ID.

8. The system of claim 7, wherein determining the case ID is based on a set of case IDs extracted from the series of computer-based actions.

9. The system of claim 7, wherein the processor is configured to, for each computer-based action where a case ID cannot be determined, assign a case ID to the computer-based action based on a case ID of another computer-based action.

10. The system of claim 7, wherein the processor is configured to for each computer-based action where a case ID cannot be determined, assign a case ID based on a time difference between actions.

11. The system of claim 7 where determining a case ID for an action comprises searching text representing the action using the set of case IDs.

12. A method for merging computer-based actions, comprising:
    using a computer processor, for a series of computer-based actions entered by one or more users, determining, for each action an identifier for the action among a set of identifiers extracted from a corpus of actions and transmitted, by a server, to a database of event logs, the computer-based actions recorded from one or more terminals, the server being remote from the terminals, the one or more terminals connected by a communication network, wherein the terminals each execute a real-time local interface collecting the computer-based actions input by users to the terminals;

for each computer-based action where an identifier cannot be determined, assigning an identifier to the computer-based action based on an identifier of another computer-based action;
creating sentences of the series of computer-based actions using the identifiers; and
combining sequences having the same identifier.

13. The method of claim 12, comprising extracting the set of identifiers using clustering.

14. The method of claim 12, comprising, for each computer-based action where an identifier cannot be determined, assigning an identifier based on a time difference between actions.

15. The method of claim 12 where determining an identifier for an action comprises searching text representing the action using the set of identifier.

16. The method of claim 12, wherein the identifier is a case ID having characteristics shared with other identifiers.

17. A method for connecting computer-based actions, comprising:
collecting, by a server, a plurality of computer-based actions recorded from one or more terminals, the server remote from the terminals, the one or more terminals connected by a communication network, and transmitting, by the server, the collected computer-based actions to a database of event logs, wherein the terminals each execute a real-time local interface collecting the computer-based actions input by users to the terminals;
using a computer processor, for a series of computer-based actions among the collected actions, determining, for each action where a case ID can be determined, the case ID for the action;
for each computer-based action where a case ID cannot be determined, assigning a case ID based on a time difference between actions;
creating sequences of the series of computer-based actions using the case IDs; and
merging a plurality of sequences comprising computer-based actions having the same case ID.

18. A method for connecting computer-based actions, comprising:
collecting, by a server, a plurality of computer-based actions recorded from one or more terminals, the server remote from the terminals, the one or more terminals connected by a communication network, and transmitting, by the server, the collected computer-based actions to a database of event logs, wherein the terminals each execute a real-time local interface collecting the computer-based actions input by users to the terminals;
using a computer processor, for a series of computer-based actions among the collected actions, determining, for each action where a case ID can be determined, the case ID for the action, wherein determining a case ID for an action comprises searching text representing the action using the set of case IDs, and wherein determining the case ID is based on a set of case IDs extracted from the series of computer-based actions;
creating sequences of the series of computer-based actions using the case IDs; and
merging a plurality of sequences comprising computer-based actions having the same case ID.

19. The method of claim 18, comprising, for each computer-based action where a case ID cannot be determined, assigning a case ID to the computer-based action based on a case ID of another computer-based action.

20. A method for connecting computer-based actions, comprising:
collecting, by a remote server, a plurality of computer-based actions recorded from one or more terminals, the server remote from the terminals, the one or more terminals connected by a communication network, and transmitting, by the server, the collected computer-based actions to a database of event logs, wherein the terminals each execute a real-time local interface collecting the computer-based actions input by users to the terminals;
using a computer processor, for a series of computer-based actions among the collected actions, determining, for each action where a case ID can be determined, the case ID for the action, wherein determining the case ID is based on a set of case IDs extracted from the series of computer-based actions, and wherein the method further comprises extracting the set of case IDs using a clustering algorithm, wherein the clustering is based on gaps in appearance of potential case IDs in a sequence of actions and consecutive appearances of potential case IDs in a sequence of actions;
creating sequences of the series of computer-based actions using the case IDs; and merging a plurality of sequences comprising computer-based actions having the same case ID.

21. A system for connecting computer-based actions, comprising:
a memory; and
a processor configured to:
collect, from a database of event logs, a plurality of computer-based actions, the actions recorded and collected from one or more terminals and transmitted to the database, the processor remote from the terminals, the one or more terminals connected by a network, wherein the terminals each execute a real-time local interface collecting the computer based actions input by users to the terminals;
for a series of computer-based actions among the collected actions, determine, for each action where a case ID can be determined, the case ID for the action;
for each computer-based action where a case ID cannot be determined, assign a case ID to the computer-based action based on a case ID of another computer-based action;
create sequences of the series of computer-based actions using the case IDs; and
merge a plurality of sequences comprising computer-based actions having the same case ID.

22. A system for connecting computer-based actions, comprising:
a memory; and
a processor configured to:
collect, from a database of event logs, a plurality of computer-based actions, the actions recorded and collected from one or more terminals and transmitted to the database by the processor, the processor remote from the terminals, the one or more terminals connected by a network, wherein the terminals each execute a real-time local interface collecting the computer based actions input by users to the terminals;
for a series of computer-based actions among the collected actions, determine, for each action where a case ID can be determined, the case ID for the action;

for each computer-based action where a case ID cannot be determined, assign a case ID based on a time difference between actions;

create sequences of the series of computer-based actions using the case IDs; and merge a plurality of sequences comprising computer-based actions having the same case ID.

23. The system of claim 22, wherein the processor is configured to extract a set of case IDs using a clustering algorithm.

24. The system of claim 23 wherein the clustering is based on gaps in appearance of potential case IDs in a sequence of actions and consecutive appearances of potential case IDs in a sequence of actions.

25. A system for connecting computer-based actions, comprising:

a memory; and a processor configured to:

collect, from a database of event logs, a plurality of computer-based actions, the actions recorded and collected from one or more terminals and transmitted to the database by the processor, the processor remote from the terminals, the one or more terminals connected by a network, wherein the terminals each execute a real-time local interface collecting the computer based actions input by users to the terminals;

for a series of computer-based actions among the collected actions, determine, for each action where a case ID can be determined, the case ID for the action, wherein determining a case ID for an action comprises searching text representing the action using the set of case IDs;

create sequences of the series of computer-based actions using the case IDs; and merge a plurality of sequences comprising computer-based actions having the same case ID.

26. A method for merging computer-based actions, comprising:

using a computer processor, for a series of computer-based actions entered by one or more users, determining, for each action an identifier for the action among a set of identifiers extracted from a corpus of actions and transmitted, by a server, to a database of event logs, the computer-based actions recorded from one or more terminals, the server being remote from the terminals, the one or more terminals connected by a communication network, wherein the terminals each execute a real-time local interface collecting the computer-based actions input by users to the terminals;

for each computer-based action where an identifier cannot be determined assigning an identifier based on a time difference between actions;

creating sentences of the series of computer-based actions using the identifiers; and combining sequences having the same identifier.

27. A method for merging computer-based actions, comprising:

using a computer processor, for a series of computer-based actions entered by one or more users, determining, for each action an identifier for the action among a set of identifiers extracted from a corpus of actions and transmitted, by a server, to a database of event logs, the computer-based actions recorded from one or more terminals, the server being remote from the terminals, the one or more terminals connected by a communication network, wherein the terminals each execute a real-time local interface collecting the computer-based actions input by users to the terminals, and wherein determining an identifier for an action comprises searching text representing the action using the set of identifier;

creating sentences of the series of computer-based actions using the identifiers; and combining sequences having the same identifier.

28. The method of claim 27, comprising, for each computer-based action where an identifier cannot be determined, assigning an identifier to the computer-based action based on an identifier of another computer-based action.

* * * * *